Jan. 4, 1927.
D. P. RANKIN
1,613,193
DRIVE BELT
Filed August 13, 1925
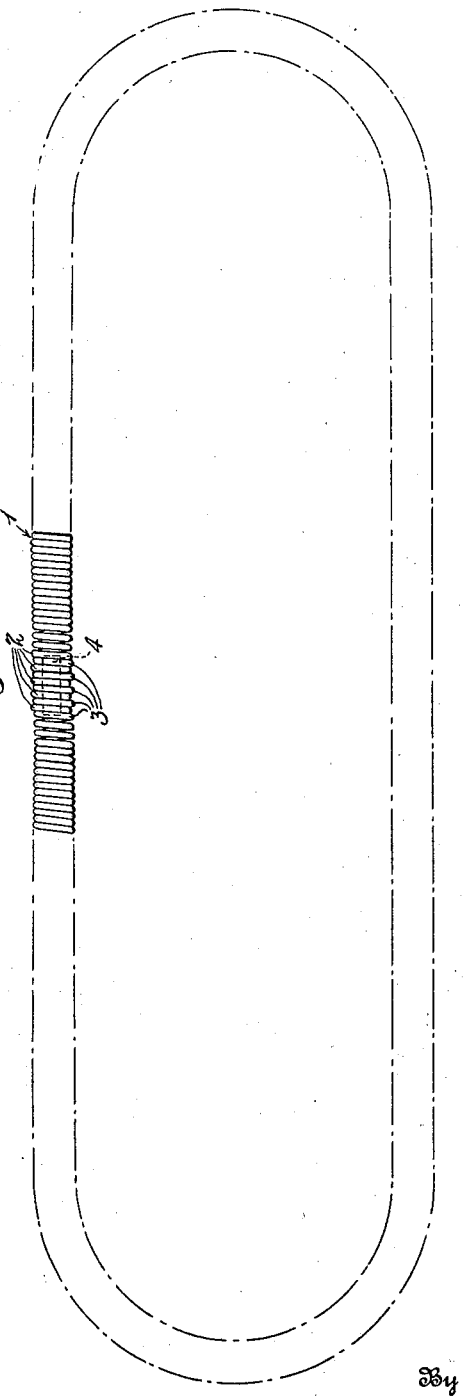
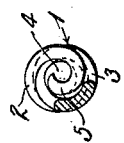
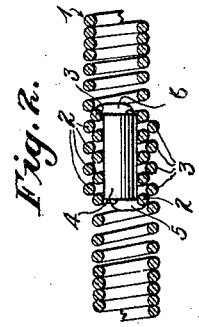
Inventor
David P. Rankin,
By Bacon & Thomas
Attorneys Patented Jan. 4, 1927.

1,613,193

UNITED STATES PATENT OFFICE.

DAVID P. RANKIN, OF KEARNEY, NEBRASKA.

DRIVE BELT.

Application filed August 13, 1925. Serial No. 50,109.

The invention relates to improvements in metal belts adapted for transmitting power from a driving to a driven shaft.

The invention more particularly relates to an improved manner of connecting the adjacent ends of a spirally formed metallic belt whereby these ends are so secured that they will not become disengaged when subject to the most severe stresses and strains. With this conception in mind, the invention more specifically comprehends an improved filler plug inserted between the attached ends of the coiled belt with one end of the belt bent down to engage one side of the filler plug while the opposite end of the belt engages the other side of the plug, the two ends of the belt being united by fitting the convolutions of the belt at one end between convolutions at the opposite end of the belt.

In the accompanying drawings,

Fig. 1 illustrates a view showing the ends of the belt attached,

Fig. 2 is a sectional view disclosing the filler plug, and

Fig. 3 is a detailed view of the plug.

Referring now more particularly to the drawings, wherein like reference characters indicate corresponding parts, the numeral 1 designates a belt formed by continuously coiling a metal wire or strand. The belt is therefore more or less flexible and is capable of use for driving a shaft from a driven pulley or in anything where it is desirable to transmit power from one element to another.

The invention more particularly relates to the means for attaching the ends of the coiled metallic member 1 to provide the endless driving belt. As before stated, the metallic member is formed by spirally winding a metallic strand or the like. When the ends of a continuous strip are attached to form a belt, the convolutions 2 at one end of a strip fit between the convolutions 3 at the opposite end of the strip. That is to say, the convolutions of the metal at one end of the strip are driven between the convolutions of the metal at the opposite end. Before the convolutions are united, a plug 4 is inserted in one end of the belt, this plug being preferably of circular formation and constructed of metal, raw-hide, or any like material. After the convolutions are united by the inter-engagement hereinbefore described, one end 5 of the belt is bent down so as to engage one side of the plug while the opposite end 6 of the belt is likewise bent inwardly to engage the opposite side of the plug. These inwardly bent ends confine the plug in position and when any stresses and strains are placed on the opposite end of the belt this force is transferred in part by the inwardly bent ends 5 and 6 to the plug, the force serving to exert a pressure on the plug in opposite directions by reason of the inbent ends 5 and 6.

It will be understood that this method of attaching the ends of the belt can be utilized with various sized belts as long as they are formed with spiral convolutions and that the plug used can be constructed of any desired material.

Having thus described my invention, what I claim is:

1. A belt composed of spirally wound metal, the adjacent ends of said belt being interfitted with the convolutions of one end fitting into the space between the convolutions at the opposite end of the belt, a filler plug disposed interiorly of said convolutions at the point where the belt ends are inter-engaged, the end of the belt at each side being bent inwardly, whereby one end engages one end of the filler plug, and the opposite end engages the other end of the filler plug.

2. A spirally wound metallic belt having its convolutions at one end inter-fitting with the convolutions at the other end of the belt, a filler plug disposed within said inter-engaging convolutions, the ends of the belt being bent inwardly to engage the opposite ends of the filler plug.

In testimony whereof I affix my signature.

DAVID P. RANKIN.